United States Patent [19]

Saito et al.

[11] Patent Number: 5,109,065
[45] Date of Patent: Apr. 28, 1992

[54] THERMOPLASTIC RESIN CHARACTERIZED BY AN IMPROVED HEAT RESISTANCE

[75] Inventors: Akihiro Saito; Kazunari Inoue, both of Utsunomiya; Hiromi Ishida; Masataka Morioka, both of Moka, all of Japan

[73] Assignee: GE Plastics Japan, Ltd., Tokyo, Japan

[21] Appl. No.: 392,226

[22] Filed: Aug. 10, 1989

[30] Foreign Application Priority Data

Aug. 10, 1988 [JP] Japan .................. 63-197896

[51] Int. Cl.$^5$ .............. C08L 51/04; C08L 53.02; C08L 71/12; C08L 77/06
[52] U.S. Cl. ..................... 525/66; 524/504; 525/68; 525/92; 525/97; 525/905
[58] Field of Search ............... 525/66, 68, 92, 905, 525/397, 97

[56] References Cited

U.S. PATENT DOCUMENTS

| | | |
|---|---|---|
| 4,839,425 | 6/1989 | Mawatari et al. ............ 525/66 |
| 4,873,276 | 10/1989 | Fujii et al. .................. 525/66 |
| 4,948,838 | 8/1990 | Jadamus et al. ............ 525/397 |

Primary Examiner—Jacob Ziegler
Attorney, Agent, or Firm—Francis T. Coppa

[57] ABSTRACT

An improved thermoplastic composition is described, comprising polyphenylene ether resin, polyamide resin, a saturated aliphatic polycarboxylic acid, and a modified polyolefin such as an ethyleneethyl acrylate-g-maleimide copolymer.

14 Claims, No Drawings

THERMOPLASTIC RESIN CHARACTERIZED BY AN IMPROVED HEAT RESISTANCE

DETAILED EXPLANATION OF THE INVENTION

1. Industrial Application Fields of the Invention

The present invention concerns a thermoplastic resin composition which contains a polyphenylene ether resin and a polyamide resin as main components.

2. Precedent Techniques of the Invention

Since the polyphenyl ether resin exhibits excellent mechanical properties and electrical properties, it is useful as a molding material. The solvent resistance of said resin, however, is inferior. In response to the aforementioned problem, attempts have been made to mix polyamide, which is characterized by an excellent solvent resistance, with the polyphenyl ether resin (see Japanese Kokai Patent No. Sho 56[1981]-16525). The miscibility between the polyphenyl ether resin and polyamide, however, is inferior, and a mixture of the two resins fails to exhibit properties unique to the two resins (e.g., excellent mechanical properties). In response to the aforementioned problem, attempts have been made to mix special functional group-containing compounds (e.g., maleic anhydride, linseed oil, liquid polybutadiene, etc.) or a liquid diene compound as a miscibility enhancer (see Japanese Kokoku Patent No. Sho 60[1985]-11966 and Sho 61[1986]-10494). Attempts have also been made to mix polyamide with a polyphenyl ether which has been modified with a certain compound (e.g., maleic anhydride, etc.) (see Japanese Kokai Patent No. Sho 59[1984]-6645).

If the aforementioned miscibility enhancers are used, the miscibility between the polyphenyl ether and polyamide is improved to a certain level, but the impact strength is less than satisfactory from a practical point of view. As a method for improving the impact strength of the aforementioned composition, the use of a polyolefin elastomer which has been modified by a special functional group has been suggested (see Japanese Kokai Patent No. Sho 62[1987]-129350, Sho 62[1987]-129351, Sho 62[1987]-177065, Sho 62[1987]-187747, and Sho 63[1988]-33471).

If the aforementioned various modified polyolefins are added, the impact strength, which is represented by the Izod value, is improved to a certain extent, but it is necessary to add a large quantity of said additive for purposes which require high impact strengths (e.g., automotive topcoat, etc.). As the quantity of the modified polyolefin elastomer increases, the impact strength increases, but as the same time, the heat resistance and rigidity deteriorate, and the physical appearance of the molded product also deteriorates.

Problems to be Solved by the Invention

Thus, a thermoplastic resin molding material which exhibits excellent heat resistance and impact resistance and in which the properties of polyphenyl ether and tetracarboxylic dianhydride are well-complemented has yet to be developed.

The foremost objective of the present invention is to provide a thermoplastic resin which exhibits an improved impact resistance without adversely affecting the heat resistance.

Mechanism for Solving the Problems

The aforementioned objective of the present invention can be attained using a thermoplastic resin composition which contains
(a) 20-77 wt % of a polyphenyl ether resin,
(b) 20-77 wt % of a polyamide resin,
(c) 3-20 wt % of a modified polyolefin which contains at least one intramolecular functional group selected from among carboxylic acid groups, metal carboxylate groups, carboxylic acid ester groups, carboxylic anhydride groups, and imido groups,
(d) 0-20 wt % of a styrene elastomer, and
(e) 0.01-5 wt % of a saturated aliphatic polycarboxylic acid with respect to 100 parts by weight of the combined weights of components (a)-(d).

The polyphenyl ether resin used as component (a) of the present invention is a conventionally known resin, and it encompasses polymers represented by the following general formula:

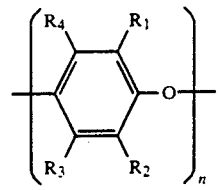

(in which $R_1$, $R_2$, $R_3$, and $R_4$ are monovalent substituents selected from among a hydrogen atom, halogen atoms, alkyl groups, alkoxy groups, haloalkyl groups in which two or more carbon atoms are present between a halogen atom and a phenyl ring, and haloalkoxy groups (these substituents may not contain tertiary α-carbon); n is an integer pertaining to the degree of polymerization). Both homopolymers and copolymers represented by the above-mentioned formula may be used. Concrete examples of especially desirable groups corresponding to $R_1$ and $R_2$ include alkyl groups containing 1–4 carbon atoms. As $R_3$ and $R_4$, the hydrogen atom and alkyl groups containing 1–4 carbon atoms are especially desirable. Concrete examples of the aforementioned resins include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. The most desirable polyphenyl ether resin is poly(2,6-dimethyl-1,4-phenylene) ether. As a polyphenyl ether copolymer, a copolymer in which an alkyl trisubstituted phenol (e.g., 2,3,6-trimethylphenol, etc.) is partially present in the aforementioned polyphenyl ether repetition unit can be used. It is also possible to use a copolymer obtained by grafting a styrene compound with said polyphenyl ether. Concrete examples of styrene compound-grafted polyphenyl ethers include copolymers obtained by graft-polymerizing styrene, α-methylstyrene, vinyltoluene, chlorostyrene, etc., with the aforementioned polyphenyl ethers.

As far as thermoplastic resin composition of the present invention is concerned, it is necessary that the quantity of said polyphenyl ether resin with respect to the combined weights of components (a), (b), (c), and (d) (same in subsequent references) be 20-77 wt %, preferably 30-70 wt %. If the quantity of the polyphenyl ether resin is less than 20 wt %, it is impossible to attain a sufficiently high heat resistance. If the quantity added exceeds 77 wt %, on the other hand, the processability deteriorates.

The polyamide resin which is used as component (b) of the present invention is a polyamide which contains amino acid, lactam, or diamine and dicarboxylic acid as main constituent components. Concrete examples of such constituent components include lactams (e.g., ε-caprolactam, enantolactam, ω-laurolactam, etc.), amino acids (e.g., ε-aminocaproic acid, 11-aminoundecanic acid, 12-aminododecanic acid, etc.), diamines (e.g., tetramethylenediamine, hexamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bisaminomethylcyclohexane, 1,4-bisaminomethylcyclohexane, bis-p-aminocyclohexylmethane, bis-p-aminocyclohexylpropane, isophoronediamine, etc.), and dicarboxylic acids (e.g., adipic acid, suberic acid, azelaic acid, sebacic acid, dodecanedicarboxylic acid, 1,4-cyclohexanedicarboxylic acid, 1,3-cyclohexanedicarboxylic acid, terephthalic acid, isophthalic acid, naphthalenedicarboxylic acid, dimeric acid, etc.). These constituent components may be polymerized either alone or in combination of two or more. The resulting polyamide homopolymers and copolymers can be equally used in the present invention. Concrete examples of especially desirable polyamides used in the present invention include caproamide (nylon 6), polyhexamethyleneadipamide (nylon 66), polyhexamethylenesebacamide (nylon 610), polyundecaneamide (nylon 11), polydodecaneamide (nylon 12), and copolymers or mixtures of the aforementioned polyamides. There are no special restrictions on the degrees of polymerization of the aforementioned polyamides, but generally speaking, resins with relative viscosities, which are measured in a 1% concentrate sulfuric acid solution at 25° C., of 1.5-5.0 are especially desirable.

The terminal groups of the aforementioned polyamides are usually blocked to enhance the melt viscosity and thermal stability. Generally speaking, it is desirable that the terminal amino group/terminal carboxyl group ratio (hereafter, terminal group ratio) be 1 or below. A polymer in which the terminal group ratio is higher than 1, however, is more desirable in the present invention since the molded product performances are improved. Such a polyamide can be manufactured by adding an excess of a compound which has a group which can be reacted with the carboxyl group (e.g., diamine, etc.) during the polymerization of the polyamide. In an alternative format, a compound which has a group which can be reacted with the carboxyl group is reacted after the polymerization of polyamide. If a polyamide with a terminal group ratio of higher than 1 is used, the physical appearance and mechanical strength of the molded product are significantly improved as compared with when a polyamide with a terminal group ratio of 1 or below is used. Such a difference was totally unexpected. When the molded product is examined in an electron microscope, fine and uniform polyphenyl ether resin particles are dispersed in the polyamide matrix [when said polyamide with a terminal group ratio of higher than 1 is used]. Although the theoretical foundation of the aforementioned difference has yet to be clarified, it is truly astounding that such tremendous differences are observed based solely on the polyamide terminal group ratio difference. Especially desirable results are obtained if the terminal group ratio is 1.1 or above, preferably 1.3 or above. In the thermoplastic resin composition of the present invention, it is necessary that the quantity of the polyamide be 20-77 wt %, preferably 30-77 wt %. If the quantity added exceeds 77 wt %, the heat resistance deteriorates. If the quantity added is less than 20 wt %, the processability deteriorates.

The modified polyolefin which is used as component (c) of the present invention is a modified polyolefin which is obtained by introducing a monomer component which contains at least one functional group selected from among carboxylic acid groups, carboxylic acid ester groups, metal carboxylate groups, carboxylic anhydride groups, and imido groups (hereafter, functional group-containing component) to a polyolefin which has been obtained by radical-polymerizing at least one olefin selected from among ethylene, propylene, 1-butene, 1-pentene, 4-methyl-1-pentene, isobutylene, 1,4-hexadiene, dicyclopentadiene, 2,5-norbornadiene, 5-ethylidenenorbornene, 5-ethyl-2,5-norbornadiene, 5-(1'-propenyl)-2-norbornene, and styrene.

Concrete examples of the aforementioned functional group-containing components include acrylic acid, methacrylic acid, maleic acid, fumaric acid, itaconic acid, crotonic acid, methylmaleic acid, methylfumaric acid, mesaconic acid, citraconic acid, glutaconic acid, metal salts of the aforementioned carboxylic acids, methyl hydrogenmaleate, methyl hydrogenitaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-(2,2,1)-5-heptene-2,3-dicarboxylic acid, endobicyclo-(2,2,1)-5-heptene-2,3-dicarboxylic anhydride, maleimide, N-ethylmaleimide, N-butylmaleimide, N-phenylmaleimide, etc.

There are no special restrictions on procedures for introducing the aforementioned functional group-containing component. For example, said component may be mixed and copolymerized with the main component (i.e., olefin), or it may be grafted with polyolefin using a radical polymerization initiator. It is desirable that the quantity of the introduced functional group-containing component with respect to the entire modified polyolefin be 0.001-40 mol %, preferably 0.01-35 mol %.

Concrete examples of modified polyolefins especially desirable in the present invention include ah ethylene-acrylic acid copolymer, ethylene-methacrylic acid copolymer, modified products in which the carboxylic acid components of the aforementioned copolymers have been partially or entirely converted into sodium, lithium, potassium, zinc, or calcium salts, ethylene-methyl acrylate copolymer, ethylene-ethyl acrylate copolymer, ethylene-methyl methacrylate copolymer, ethylene-ethyl methacrylate copolymer, ethylene-ethyl acrylate-g-maleic anhydride copolymer ("g" refers to graft, same in subsequent references), ethylene-maleic anhydride-g-maleic anhydride copolymer, ethylene-ethyl acrylate-g-maleimide copolymer, ethylene-ethyl acrylate-g-N-phenylmaleimide copolymer, partial saponification products of the aforementioned copolymers, ethylene-propylene-g-maleic anhydride copolymer, ethylene-butene-1-g-maleic anhydride copolymer, ethylene-propylene-1,4-hexadiene-g-maleic anhydride copolymer, ethylene-propylene-dicyclopentadiene-g-maleic anhydride copolymer, ethylene-propylene-2,5-norbornadiene-g-maleic anhydride copolymer, ethylene-propylene-g-N-phenylmaleimide copolymer, ethylene-butene-1-g-N-phenylmaleimide copolymer, styrene-maleic anhydride copolymer, etc. These polymers may be used either alone or in combination. As far as the present invention is concerned, it is necessary that the quantity of modified polyolefin (c) with respect to the combined weights of components (a), (b), (c), and (d) be 3-20 wt %. If the quantity added is less than 3 wt %, it is impossible to effectively improve the impact resistance. If the quantity added exceeds 20 wt %, on the other hand, it is undesirable since the heat resistance and rigidity deteriorate.

The styrene elastomer which is used as component (d) of the present invention is a copolymer consisting of a vinyl aromatic compound conjugated diene random, block, and graft copolymer [sic]. Concrete examples include A-B-A and A-B (A: polystyrene; B: elastomeric diene (e.g., polybutadiene, etc.)) hydrogenated or non-hydrogenated block copolymers, styrene-conjugated diene radial tereblock copolymer, acrylic resin-modified styrene, butadiene [sic; styrene-butadiene]resin, and graft copolymers which have been obtained by graft-copolymerizing a monomer or monomer mixture consisting principally of a styrene compound with a rubber polymer.

If the concentration of said styrene lubricant is 20 wt % or below in the resin composition of the present invention, various physical properties (e.g., impact strength, processibility, etc.) can be further improved. Especially desirable results are obtained if the quantity of the styrene elastomer is 5-15 wt %.

The saturated aliphatic polycarboxylic acid or its derivative used as component (e) of the present invention is characterized by the following structure:

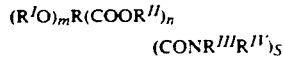

(in which the notations signify the following:
R: linear or branched saturated aliphatic hydrocarbon group (number of carbon atoms: 2-20, preferably 2-10);
$R^I$: hydrogen atom, alkyl group, aryl group, acyl group, or carbonyldioxy group (number of carbon atoms: 1-10, more preferably 1-6, or most preferably 1-4; hydrogen is the most desirable);
$R^{II}$: hydrogen, alkyl group, or aryl group (number of carbon atoms: 1-20, preferably 1-10);
$R^{III}$ and $R^{IV}$: hydrogen atom, alkyl group, or aryl group (number of carbon atoms: 1-10, more preferably 1-6, or most preferably 1-4);
$m=1$;
$n+S \geq 2$, preferably 2 or 3;
$n \geq 0$; $S \geq 0$;
$(R^I O)$ is located at the $\alpha$-position or $\beta$-position of the carbonyl group;
2-6 carbon atoms are present in two or more carbonyl groups).

As the saturated aliphatic polycarboxylic acid derivative of the present invention, saturated aliphatic polycarboxylic acid ester compounds, amide compounds, anhydrides, hydrated products [sic], and salts can be used. Concrete examples of saturated aliphatic polycarboxylic acids include citric acid, malic acid, agaric acid, etc. Concrete examples of acid ester compounds include citric acid acetyl ester and mono- or distearyl ester. Concrete examples of acid amide compounds include citric N,N'-diethylamide, N,N'-dipropylamide, N-phenylamide, N-dodecylamide, and N,N'-didodecylamide, and malic acid N-dodecylamide. In particular, citric acid, malic acid, and their derivatives are especially desirable.

It is necessary that the quantity of component (e) with respect to 100 parts by weight of the resin composition of the present invention be 0.01-5 parts by weight, preferably 0.03-3 parts by weight. If the quantity added is less than 0.01 parts by weight, the effects are negligible. If the quantity added exceeds 5 parts by weight, on the other hand, it is undesirable since thermal coloration is accelerated.

The thermoplastic resin composition of the present invention can be manufactured by mixing [the constituent components]using various extruders, Banbury mixer, kneader, rolls, etc.

In the aforementioned mixing process, the constituent components of the present invention may be simultaneously mixed together to manufacture the composition of the present invention. In an alternative format, one, two, or more components are first mixed together, and after the resulting mixture has been mixed with the remaining components, the thermoplastic resin composition of the present invention is obtained.

In addition to the aforementioned constituent components, furthermore, the resin composition of the present invention may also contain resins which are miscible with polyphenyl ether (e.g., polystyrene, etc.).

Various additives (e.g., pigments, dyes, reinforcements, fillers, heat resistance enhancers, antioxidants, weather resistance enhancers, lubricants, mold-releasing agents, crystalline nucleating agents, plasticizers, flame retardants, fluidity enhancers, antistatic agents, etc.) may be added to the resin composition of the present invention during the mixing or molding process as long as these additives exert no adverse effects on vital properties of said composition.

If the resin composition of the present invention is molded by an appropriate method (e.g., injection-molding method, blow-molding method, extrusion-molding method, etc.), the resulting molded product exhibits various excellent properties (e.g., heat resistance, impact resistance, water resistance, dimensional stability, etc.). The resulting molded product is extremely useful as automotive exterior components (e.g., faders [sic; presumably, fenders], door panels, quarter panels, bumpers, spoilers, wheel caps, feel [sic; presumably fuel]lids, side shields, etc.) as well as various general-purpose mechanical components.

In the paragraphs to follow, the contents of the present invention will be explained in further detail with reference to application examples.

In subsequent application examples and comparative examples, various properties were evaluated according to the following procedures:

1. Melt index: measurements were carried out according to the procedures specified in JIS K 7210 at 280° C. at a load of 5 kg.
2. Tensile properties: ASTM D 638.
3. Bendino properties: ASTM D 790.
4. Izod impact strength: ASTM D 256.
5. Thermal deformation point: ASTM D 648 (load: 4.6 kg/cm$^2$).
6. Cracking patterns: a molded product with a thickness of 3 mm was punched at $-30°$ C. and 5 m/sec, and the cracking pattern was evaluated.

APPLICATION EXAMPLES 1-4 AND COMPARATIVE EXAMPLES 1 AND 2

Poly(2,6-dimethyl-1,4-phenylene) ether was used as component (a).

Two types of nylon 6 were prepared as component (b). The terminal amino group concentration and terminal carboxyl group concentration of the first polyamide were $8.4 \times 10^{-5}$ mol/g and $1.8 \times 10^{-5}$ mol/g, respectively. The terminal amino group concentration and terminal carboxyl group concentration of the second polyamide were $4.6 \times 10^{-5}$ mol/g and $7.0 \times 10^{-5}$ mol/g, respectively. The molecular weight was 13,000 in each case. After the aforementioned two types of polyamides had been mixed together, a polyamide characterized by a certain terminal group ratio was obtained. When the terminal group ratio was controlled during a polymerization process rather than mixing the aforementioned two types of polyamides, the resulting molded product exhibited comparable properties.

As component (c), an ethylene-propylene copolymer with a maleic anhydride content of 1 mol % and a melt index of 0.4 g/10 min (C-1) or an ethylene-ethyl acrylate copolymer with a maleic anhydride content of 0.5 mol % and a melt index of 2.0 (C-2) was used.

As component (d), a styrene-ethylene-butylene-styrene copolymer (Kraton G-1651, manufactured by Shell Chemical Co.) was used.

As component (e), citric acid was used.

After the aforementioned components had been mixed together, the resulting mixture was extruded from a biaxial extruder containing a vent at reduced pressure at 290° C. Thus, a pellet was obtained. After the resulting pellet had been injection-molded from an injection-molding machine at a cylinder temperature of 280° C., injection pressure of 1,200 kg/cm², and at a mold temperature of 80° C., the resulting molded product underwent various performance tests.

The constituent components of the resin compositions used in the application examples and comparative examples as well as the performance test results are summarized in Table I.

TABLE I

|  |  |  | 1 1 | 1 2 | 1 3 | 1 4 | 1 5 | 1 6 | 2 1 | 2 2 | 2 3 |
|---|---|---|---|---|---|---|---|---|---|---|---|
| (a) 3 | 4 wt % 5 |  | 45 | 45 | 45 | 45 | 45 | 40 | 45 | 40 | 40 |
| (b) 3 | 6 wt % |  | 40 | 40 |  |  |  |  |  |  |  |
|  | 6 wt % |  |  |  | 40 | 40 | 45 | 40 | 45 | 40 | 35 |
| (c) 3 | 7 |  |  |  |  |  |  |  |  |  |  |
|  | 8 | (C-1) wt % | 5 |  | 5 |  | 15 | 20 | 15 | 20 | 25 |
|  |  | (C-2) wt % |  | 5 |  | 5 |  |  |  |  |  |
| (d) 3 | 9 (KG-1651) wt % |  | 10 | 10 | 10 | 10 |  |  |  |  |  |
| (e) 3 | 10 |  | 1.4 | 1.4 | 1.4 | 1.4 | 1.4 | 1.4 |  |  |  |
| 11 | (kgcm/cm) |  | 75 | 84 | 80 | 88 | 68 | 76 | 30 | 40 | 62 |
| 12 | (kg/cm²) |  | 500 | 510 | 500 | 510 | 480 | 400 | 400 | 400 | 380 |
| 13 | (kg/cm²) |  | 18500 | 18500 | 18500 | 18500 | 17000 | 16000 | 17000 | 16000 | 15400 |
| 14 | (°C.) |  | 182 | 181 | 182 | 182 | 174 | 168 | 174 | 160 | 158 |
| 15 | (g/10) |  | 6.7 | 5.2 | 5.6 | 5.0 | 4.6 | 3.4 | 5.0 | 4.0 | 3.2 |
| 16 | D ... |  | D | D | D | D | D | D | B | B | D |

Key:
(1) Application Example
(2) Comparative Example
(3) Component
(4) Polyphenyl ether
(5) Polyamide
(6) Terminal group ratio
(7) Modified polyolefin
(8) Elastomer
(9) Styrene elastomer
(10) Saturated aliphatic carboxylic acid (citric acid)
(11) Izod impact strength (with a notch)
(12) Tensile strength
(13) Bending elasticity
(14) Thermal deformation point
(15) Melt index (g/10 min)
(16) Cracking patterns. B: brittle fracture D. tenacious fracture If the quantity of the modified polyolefin increases in the conventional method, the Izod impact strength may improve, but the thermal deformation point significantly decreases (Comparative Examples 1-3).

When the results of Application Examples 5 and 6 and Comparative Examples 1-3 are compared, it is obvious that both the Izod impact strength and thermal deformation point are improved by adding a saturated aliphatic carboxylic acid.

In Application Examples 1-4, a styrene elastomer and a saturated aliphatic carboxylic acid were used in combination with an extremely small quantity of a modified polyolefin elastomer. As a result, the Izod impact strength was significantly improved while the thermal deformation point loss was minimized.

We claim:

1. A thermoplastic resin composition which comprises
   (a) 20-77 wt % of a polyphenyl ether resin,
   (b) 20-77 wt % of a polyamide resin,
   (c) 3-20 wt % of a modified polyolefin which contains at least one intramolecular functional group selected from the group consisting of carboxylic acid groups, metal carboxylate groups, carboxylic acid ester groups, carboxylic anhydride groups, and imido groups,
   (d) 0-20 wt % of a styrene elastomer, and
   (e) 0.01-5 wt % of a saturated aliphatic polycarboxylic acid with respect to 100 parts by weight of the combined weights of components (a)-(d).

2. The thermoplastic resin composition specified in claim 1 in which said polyamide resin is a polyamide resin in which the number of terminal amino groups is larger than the number of terminal carboxyl groups.

3. The thermoplastic resin composition of claim 1 wherein the saturated aliphatic polycarboxylic acid of component (e) is selected from the group consisting of citric acid, malic acid, and agaric acid.

4. The thermoplastic resin composition of claim 1 wherein the modified polyolefin of component (c) is selected from the group consisting of ethylene-acrylic acid copolymers; ethylene-methacrylic acid copolymers; modified derivatives of these copolymers in which their carboxylic acid components have been partially or entirely converted into sodium, lithium, potassium, zinc, or calcium salts; and combinations of any of these copolymers.

5. The thermoplastic resin composition of claim 1 wherein the modified polyolefin of component (c) is selected from the group consisting of ethylene-methyl acrylate copolymer, ethylene-ethyl acrylate copolymer, ethylene-methyl methacrylate copolymer, ethylene-ethyl methacrylate copolymer, ethylene-ethyl acrylate-g-maleic anhydride copolymer, ethylene-maleic anhydride-g-maleic anhydride copolymer, ethylene-ethyl acrylate-g-maleimide copolymer, ethylene-ethyl acrylate-g-N-phenylmaleimide copolymer, partial saponification products of any of these copolymers, and combinations of any of these copolymers.

6. The thermoplastic resin composition of claim 1 wherein the modified polyolefin of component (c) is selected from the group consisting of ethylene-propylene-g-maleic anhydride copolymer, ethylene-butene-1-g-maleic anhydride copolymer, ethylene-propylene-1,4-hexadiene-g-maleic anhydride copolymer, ethylene-propylene-dicyclopentadiene-g-maleic anhydride copolymer, ethylene-propylene-2,5-norbornadiene-g-maleic anhydride copolymer, ethylene-propylene-g-N-phenylmaleimide copolymer, ethylene-butene-1-g-N-phenylmaleimide copolymer, and combinations of these copolymers.

7. An improved thermoplastic resin composition comprising:
   a) 20-77 weight percent of a polyphenylene ether resin selected from the group consisting of poly(2,6-dimethyl-1,4-phenylene) ether, poly(2,3,6-trimethyl-1,4-phenylene) ether, and mixtures or copolymers of these resins;
   b) 20-77 weight percent of at least one polyamide resin selected from the group consisting of Nylon 6, Nylon 66, NYLON 6/10, and NYLON 12;
   c) 3-20 weight percent of a modified polyolefin selected from the group consisting of ethylene-propylene-graft-maleic anhydride copolymer, ethylene-butene-1-graft-maleic anhydride copolymer, ethylene-ethyl acrylate-graft-maleic anhydride copolymer, ethylene-maleic anhydride-graft-maleic anhydride copolymer, and ethylene-ethyl acrylate-g-maleimide copolymer;
   d) 2-20 weight percent of a diblock or triblock styrene-butadiene copolymer which is hydrogenated or nonhydrogenated; and
   e) 0.01-5 weight percent of a saturated aliphatic polycarboxylic acid selected from the group consisting of citric acid, malic acid, derivatives of citric or malic acid, and agaric acid.

8. A thermoplastic resin composition which consists essentially of:
   a) 20-77 weight percent of polyphenylene ether resin;
   b) 20-77 weight percent of a polyamide resin;
   c) 3-20 weight percent of a modified polyolefin which contains at least one intramolecular functional group selected from the group consisting of carboxylic acid groups, metal carboxylate groups, carboxylic acid ester groups, carboxylic anhydride groups, and imido groups;
   d) 0-20 weight percent of a styrene elastomer; and
   e) 0.01-5 weight percent of a saturated aliphatic polycarboxylic acid, based on 100 parts by weight of the combined weights of components (a)-(d).

9. The composition of claim 8, wherein the modified polyolefin is selected from the group consisting of ethylene-ethyl acrylate-g-maleic anhydride copolymer; ethylene-ethyl acrylate-g-maleimide copolymer; ethylene-ethyl acrylate-g-N-phenylmaleimide copolymer; partial saponification products of the aforementioned copolymers; ethylene-propylene-g-maleic anhydride copolymer; ethylene-butene-1-g-maleic anhydride copolymer; ethylene-propylene-1,4-hexadiene-g-maleic anhydride copolymer; ethylene-propylene-dicyclopentadiene-g-maleic anhydride copolymer; and ethylene-propylene-2,5-norbornadiene-g-maleic anhydride copolymer.

10. The composition of claim 8, wherein component (d) comprises at least 5 weight percent of a diblock or triblock styrene-butadiene copolymer which is hydrogenated or nonhydrogenated.

11. The composition of claim 8, wherein component (e) comprises 0.01-5 weight percent of a saturated aliphatic polycarboxylic acid selected from the group consisting of citric acid, malic acid, derivatives of citric or malic acid, and agaric acid.

12. An improved thermoplastic composition, consisting essentially of:
   a) 20-77 weight percent of a polyphenylene ether resin selected from the group consisting of poly(2,6-dimethyl-1,4-phenylene) ether, poly(2,3,6-trimethyl-1,4-phenylene) ether, and mixtures or copolymers of these resins;
   b) 20-77 weight percent of at least one polyamide resin selected from the group consisting of Nylon 6, Nylon 6/10, NYLON 12; and NYLON 66
   c) 3-20 weight percent of a modified polyolefin selected from the group consisting of ethylene-propylene copolymers with an intramolecular functional group content in the range of 0.01 to 35 mole percent, based on the entire weight of modified polyolefin; and ethylene-ethyl acrylate copolymers with an intramolecular functional group content in the range of 0.01 to 35 mole percent, based on the entire weight of modified polyolefin.
   d) 0-20 weight percent of a diblock or triblock styrene-butadiene copolymer which is hydrogenated or nonhydrogenated; and
   e) 0.01-5 weight percent of a saturated aliphatic polycarboxylic acid selected from the group consisting of citric acid, malic acid, derivatives of citric or malic acid, and agaric acid.

13. The composition of claim 12, wherein the intramolecular functional group is maleic anhydride.

14. The composition of claim 12, wherein component (d) is present at a level of at least 5 weight percent.